United States Patent
Weh (10) Patent No.: US 8,939,520 B2
(45) Date of Patent: Jan. 27, 2015

(54) STRUCTURAL UNIT HAVING A CONTROL UNIT HOUSING AND A HYDRAULIC ASSEMBLY HOUSING

(75) Inventor: Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 1267 days.

(21) Appl. No.: 12/160,910

(22) PCT Filed: Jan. 3, 2007

(86) PCT No.: PCT/EP2007/050026
§ 371 (c)(1),
(2), (4) Date: Jul. 15, 2008

(87) PCT Pub. No.: WO2007/090689
PCT Pub. Date: Aug. 16, 2007

(65) Prior Publication Data
US 2010/0182752 A1    Jul. 22, 2010

(30) Foreign Application Priority Data
Feb. 6, 2006   (DE) .......................... 10 2006 005 185

(51) Int. Cl.
*B60T 8/36*     (2006.01)
*F15B 13/08*    (2006.01)
*B60T 15/14*    (2006.01)

(52) U.S. Cl.
CPC ............ *B60T 8/368* (2013.01); *F15B 13/0814* (2013.01); *F15B 13/0828* (2013.01); *F15B 13/0835* (2013.01); *F15B 13/0853* (2013.01); *F15B 13/0857* (2013.01); *F15B 13/0889* (2013.01); *F15B 13/0892* (2013.01); *Y10S 303/10* (2013.01)

USPC .................................. 303/119.3; 303/DIG. 10

(58) Field of Classification Search
USPC .................. 303/DIG. 10, 119.1, 119.2, 119.3
See application file for complete search history.

(56) References Cited

U.S. PATENT DOCUMENTS 5,066,075 A * 11/1991 Kaneda et al. ............. 303/113.1
5,513,905 A    5/1996 Zeides et al.
6,062,533 A * 5/2000 Kappel et al. ................... 251/57
6,079,798 A * 6/2000 Hosoya ....................... 303/119.3

(Continued)

FOREIGN PATENT DOCUMENTS

DE     10245069 A1 * 4/2004
EP     0658463 A2    6/1995

(Continued)

OTHER PUBLICATIONS

Machine English Translation of DE-10245069, Apr. 2004.*

*Primary Examiner* — Melody Burch
(74) *Attorney, Agent, or Firm* — Maginot, Moore & Beck LLP (57) ABSTRACT

A structural unit having a control unit housing and a hydraulic assembly housing is proposed. The control unit housing and the hydraulic assembly housing form a receiving chamber with a covering for at least one electrical component. The at least one electrical component is arranged in the receiving chamber in a sealed manner at least in the region of contact faces between the component and the chamber. For each component, one seal is applied in a fluid process and is assigned individually to the relevant electrical component to be arranged. The seal is applied in the region of the contact faces between the component and the covering of the electrical component, the control unit housing, and the hydraulic assembly housing.

12 Claims, 6 Drawing Sheets

(56) References Cited

U.S. PATENT DOCUMENTS

| | | | |
|---|---|---|---|
| 6,142,751 A | 11/2000 | Krauter et al. | |
| 6,352,317 B1* | 3/2002 | Blazic et al. | 303/119.2 |
| 6,634,723 B1* | 10/2003 | Ganzel et al. | 303/119.3 |
| 6,662,825 B2* | 12/2003 | Frank et al. | 137/557 |
| 7,354,117 B2* | 4/2008 | Otsuka et al. | 303/116.4 |
| 2004/0207256 A1* | 10/2004 | Volz | 303/119.3 |
| 2005/0057093 A1* | 3/2005 | Segawa et al. | 303/119.3 |
| 2005/0092951 A1* | 5/2005 | Groetzinger | 251/129.15 |
| 2005/0217740 A1* | 10/2005 | Segi et al. | 137/625.65 |
| 2006/0158030 A1 | 7/2006 | Beck et al. | |
| 2008/0174192 A1* | 7/2008 | Dinkel et al. | 310/89 |

FOREIGN PATENT DOCUMENTS

| | | |
|---|---|---|
| EP | 0882632 A2 | 12/1998 |
| JP | 11029030 A | 2/1999 |
| WO | 2004074061 A1 | 9/2004 |
| WO | WO-2006120245 A1 * | 11/2006 |

* cited by examiner

STRUCTURAL UNIT HAVING A CONTROL UNIT HOUSING AND A HYDRAULIC ASSEMBLY HOUSING

CROSS-REFERENCE TO RELATED APPLICATION

This application is a 35 USC 371 application of PCT/EP 2007/050026 filed on Jan. 3, 2007.

BACKGROUND OF THE INVENTION

1. Field of the Invention

The invention relates to a structural unit having a control unit housing and a hydraulic assembly housing.

2. Description of the Prior Art

In practice, a distinction can be made between hydraulic systems in which a control unit is located directly on a hydraulic assembly, and hydraulic systems with theses components disposed separately. In systems in which the control unit is located directly on the hydraulic assembly, a receiving chamber formed by the control unit housing and the hydraulic assembly housing for electrical components must be sealed off from such environmental factors as temperature, liquids such as oil or brake fluid, and mechanical loads such as dirt.

In the industry, sealing off the receiving chamber by way of sealing a contact face of the two housings by means of a fluid seal is known. In such an embodiment, it is disadvantageous that a great wall thickness of the housing is necessary, which entails high material costs.

For sealing off the receiving chamber, it is also known in the industry for the receiving chamber to be potted with a sealing composition. However, this requires using a large amount of material, which has an adverse effect on the weight of the entire structural unit. Moreover, the use of a large amount of material means correspondingly high material costs.

It is also known from the industry to seal off the electrical components located in the receiving chamber by way of individual seals, which are made in the form of inlay seals. With this kind of structural design, it is disadvantageously necessary to machine the contact faces for the inlay seals, which results in high machining costs and makes the assembly process difficult and expensive.

It is the object of the present invention to create a structural unit with a control unit housing and a hydraulic assembly housing in which sealing that is both economical and quickly installed is attained.

SUMMARY AND ADVANTAGES OF THE INVENTION

The invention provides a structural unit having a control unit housing and a hydraulic assembly housing, in which the control unit housing and the hydraulic assembly housing form a receiving chamber for at least one electrical component having a covering, and the at least one electrical component, at least in the region of its contact faces, is located in a sealed manner in the receiving chamber. According to the invention, it is provided that a seal, individually associated with the respective electrical component and applied by a fluid process, is located in the region of the contact faces, between the covering of the electrical component and the control unit housing and the hydraulic assembly housing, respectively.

By the use of a fluid seal, machining the contact faces for the seal can advantageously be avoided, thus reducing the machining times.

Also by means of the individual seal according to the invention, a low wall thickness of the housing little material can be attained without a contact face that requires sealing between the housings, and in the case of plastic manufacture, the extrusion device can be altered in such a way that the length that has to be deburred is kept short.

An especially simple embodiment of the seal is made possible by providing that the seal is disposed radially around a connection region where the electrical component is connected to the hydraulic assembly housing or to the control unit housing on the side toward the receiving chamber.

Expediently, the connection region where the electrical component is connected to the control unit housing and the hydraulic assembly housing is embodied such that the control unit housing and the hydraulic assembly housing have a recess, shaped to suit the circumferential contour of the electrical component, into which recess the electrical component is inserted, and the seal is disposed at least approximately annularly on the circumferential contour of the recess.

In an advantageous embodiment of the invention, the at least one electrical component can be embodied as an electromagnetic coil. The efficiency of the coil is advantageously improved when a fluid seal of the invention is used, because of the possibility of adhering to close axial tolerances, and as a result the thermal concept of the structural unit can be favorably affected.

The at least one electrical component can also be embodied as a connection plug whose covering is embodied as a sleevelike region of the control unit housing and that is solidly joined by one end to a bottom face that is defined by a side wall of the control unit housing.

If the at least one electrical component is embodied as a magnet valve affixed to the hydraulic assembly housing, then the regulation tolerance of the magnet valve is advantageously improved by the close axial tolerances that are attainable with a fluid seal.

Further advantages and advantageous features of the subject of the invention can be learned from the description, drawings, and claims.

BRIEF DESCRIPTION OF THE DRAWING

One exemplary embodiment of a structural unit designed according to the invention is shown in the drawings and described in further detail in the ensuing description.

DESCRIPTION OF THE PREFERRED EMBODIMENT

Figure 1:
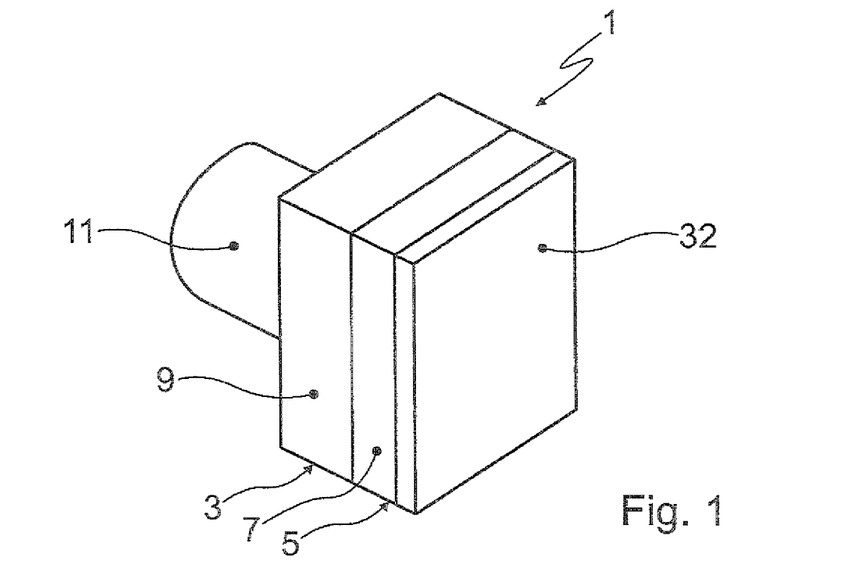
FIG. 1 depicts a highly simplified three-dimensional view of a structural unit with a control unit housing and a hydraulic assembly housing of a motor vehicle brake system.

In FIG. 1, a structural unit 1 is shown which forms a regulator of a vehicle brake system, not further shown, and has as its main components a hydraulic assembly 3, with an electric motor 11, and a control unit 5. In a known manner, piston pumps, magnet valves 8 (FIGS. 6-9), hydraulic reservoirs, damper chambers, and similar hydraulic components are inserted into the hydraulic assembly 3 and hydraulically interconnected. The control unit 5, which has an electronic regulating circuit in the form of a printed circuit board 42 (FIGS. 6 and 11) that triggers the piston pumps, the electric motor 11 connected to them, and the magnet valves 8 of the hydraulic assembly 3, is connected to the hydraulic assembly 3.

The connection of the control unit 5 to the hydraulic assembly 3 is made via a connection of the control unit housing 7 of the control unit 5 to a hydraulic assembly housing 9 of the hydraulic assembly 3.

Figure 2:
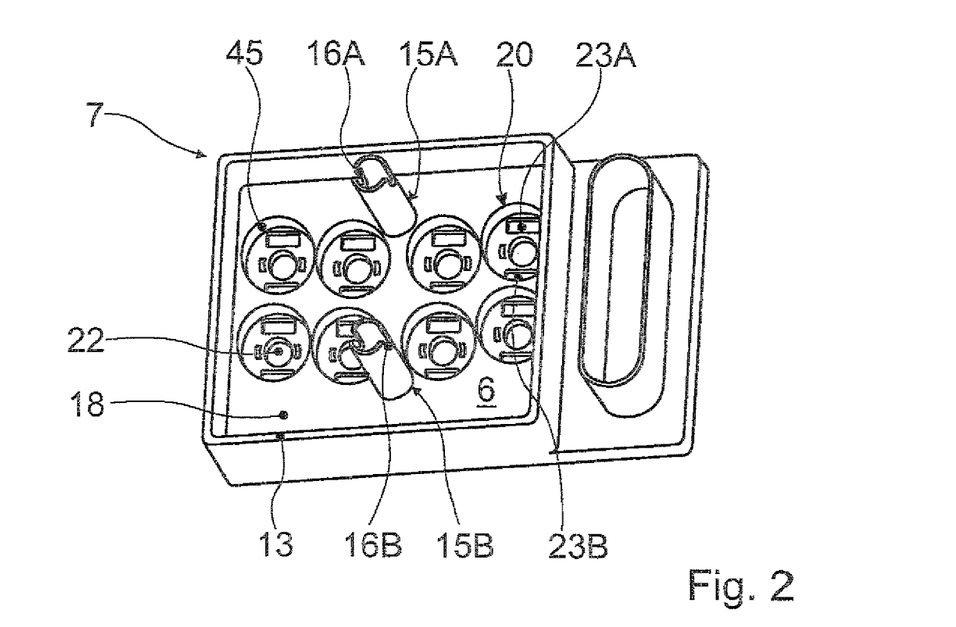
FIG. 2 shows a simplified perspective view of the control unit housing of FIG. 1 shown by itself.
Figure 5:
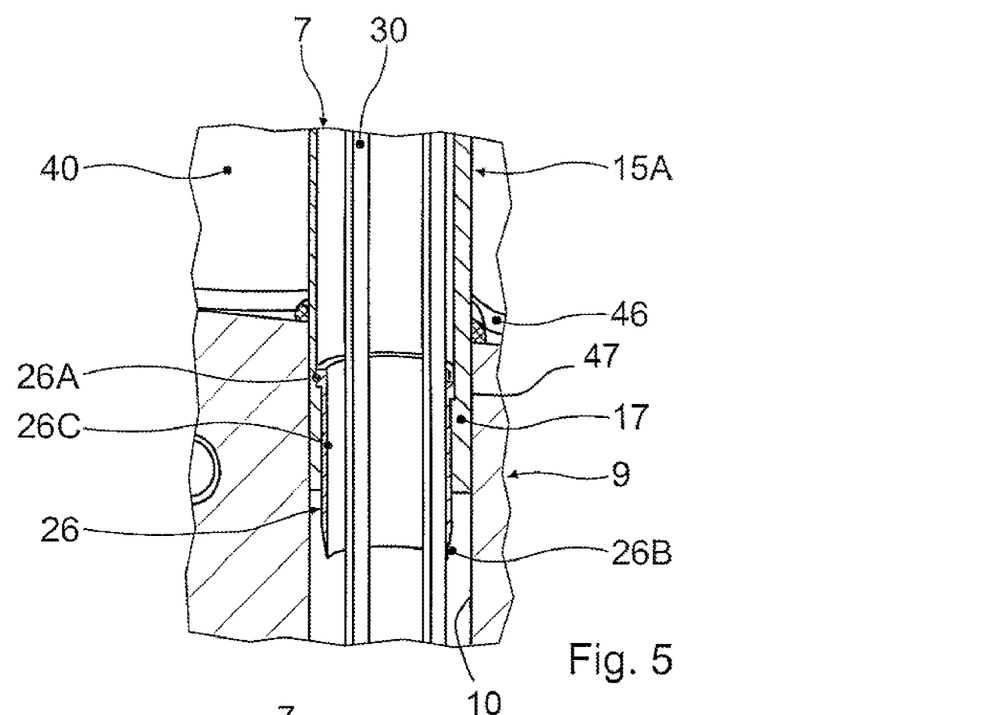
FIG. 5 illustrates the sleevelike region of FIG. 4, with a connection plug guided by the fastening element.

The control unit housing 7 shown in further detail in FIG. 2 is embodied with sleevelike regions, in the form of a first tube 15A and a second tube 15B, which on their respective ends remote from a bottom face 18 of the control unit 7 each have a respective slit 16A and 16B, extending in the longitudinal direction of the tubes, for increasing the elasticity. The tubes 15A and 15B are each solidly connected on one end to the bottom face 18, which is defined by a side wall 13 of the control unit housing 7. In the direction of their ends pointing away from the bottom face of the control unit housing 7, the tubes 15A, 15B each narrow in diameter; a stepped shoulder 17 serves to narrow the diameter. The tubes 15A and 15B are configured to serve as coverings for the connection plugs 30 (FIG. 5).

The bottom face 18 of the control unit housing 7 here has eight round recesses 20 for receiving individual coils 40, along with their coverings 50, and the recesses 20 centrally have a concentric through hole 22 for the magnet valve 8 and, in the vicinity of their circumference, two elongated slits 23A, 23B for contact plugs 41A, 41B, (FIG. 6), which serve to connect the coils 40 to the printed circuit board 42.

Figure 10:
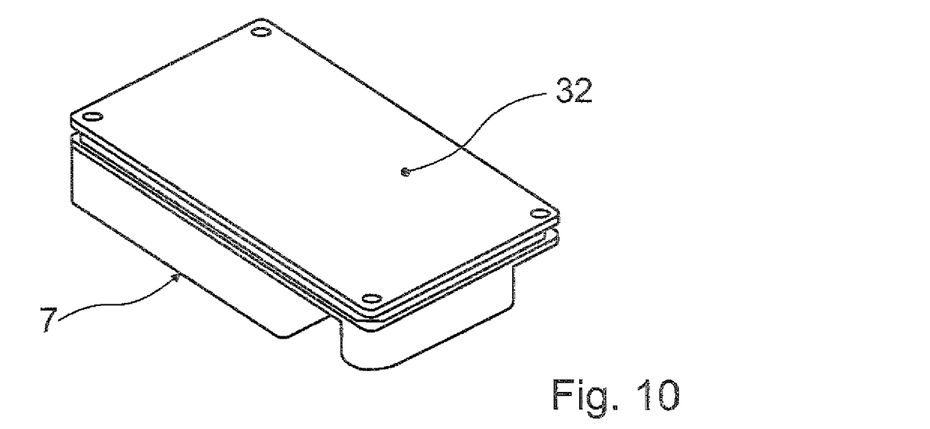
FIG. 10 is a rear view of the control unit housing of FIG. 2, with a cap and a printed circuit board contained in the cap.
Figure 11:
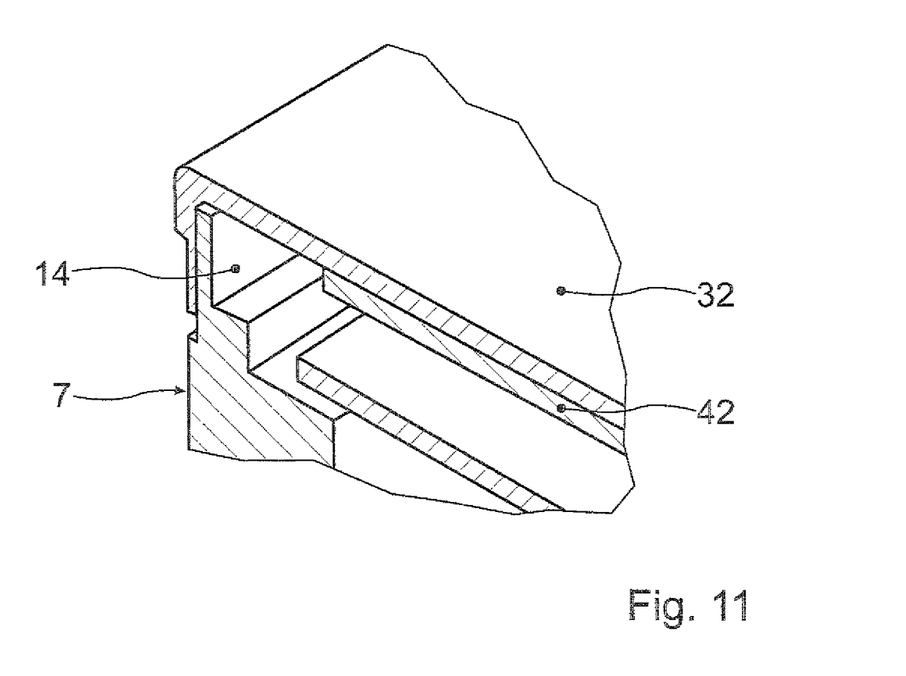
FIG. 11 is a simplified sectional view of a region of the control unit housing of FIG. 6.

As can be seen from FIGS. 10 and 11, the printed circuit board 42 is integrated with a cap 32 on the back side of the control unit housing 7; the cap is sealingly affixed, via a welded or glued connection, to a frame 14 of the control unit housing 7 that extends away from the side of the bottom face 18 remote from the tubes 15A, 15B, so that for connecting the cap 32 to the control unit housing 7, screws outside the side walls 13 of the control unit housing 7 can be dispensed with.

Figure 6:
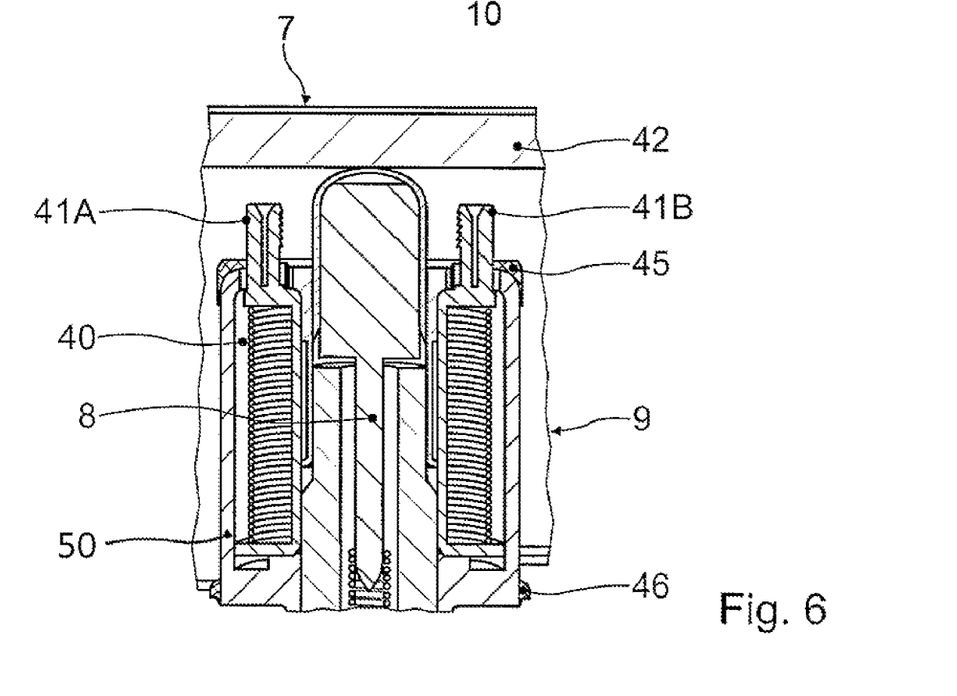
FIG. 6 is a schematic longitudinal section through a coil and a magnet valve in a receiving chamber, in the installed state.
Figure 7:
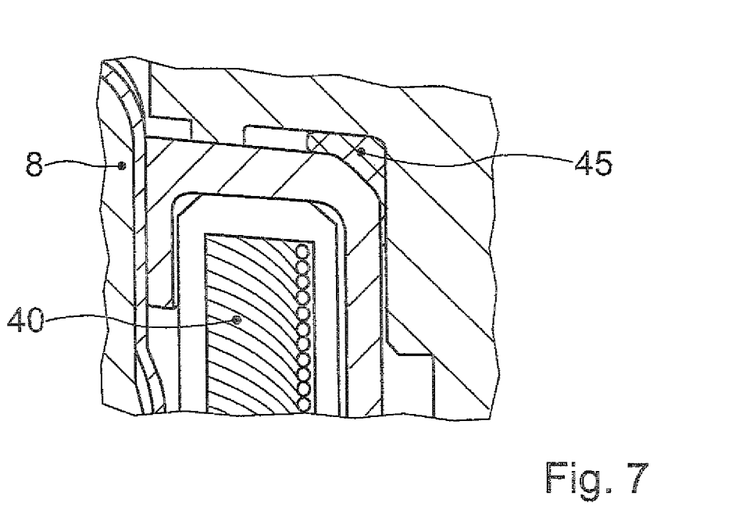
FIG. 7 is an enlarged fragment of FIG. 6 which in further detail shows the fixation and sealing of the coils on the control unit housing.
Figure 8:
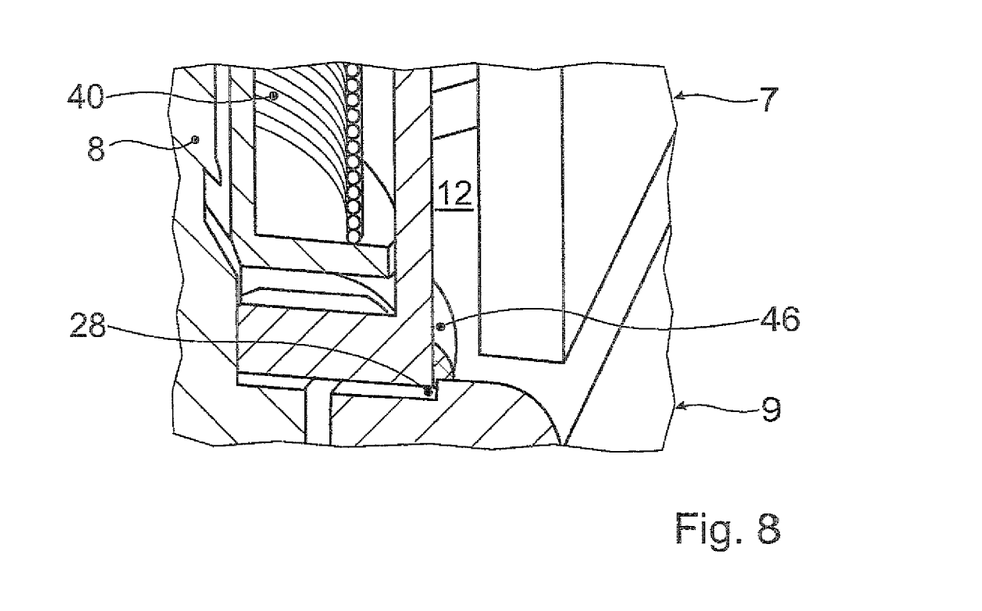
FIG. 8 is an enlarged fragment of FIG. 6 which in further detail shows the fixation of the coils to the hydraulic assembly housing.

As can also be seen from FIGS. 6-8, a fluid seal 45 and 46, preferably of silicone, is applied to a circumference of the recess 20; the first seal 45 serves to seal off the coils 40 from the control unit housing 7, and the second seal 46 serves to seal off the coils 40 from the hydraulic assembly housing 9.

Upon being introduced into the recess 20, the coil 40 snaps into an indentation 28 located in the recess 20 and is affixed to that indentation.

Figure 3:
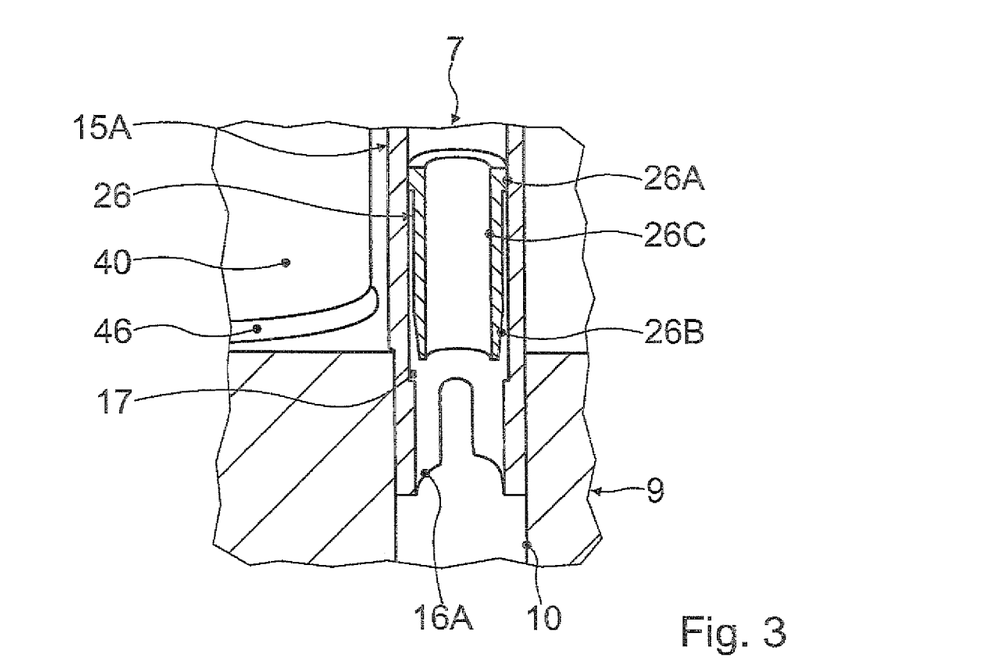
FIG. 3 is a schematic longitudinal section through a sleevelike region of the control unit housing, with a fastening element disposed in it for connection to the hydraulic assembly housing in an assembly state.
Figure 4:
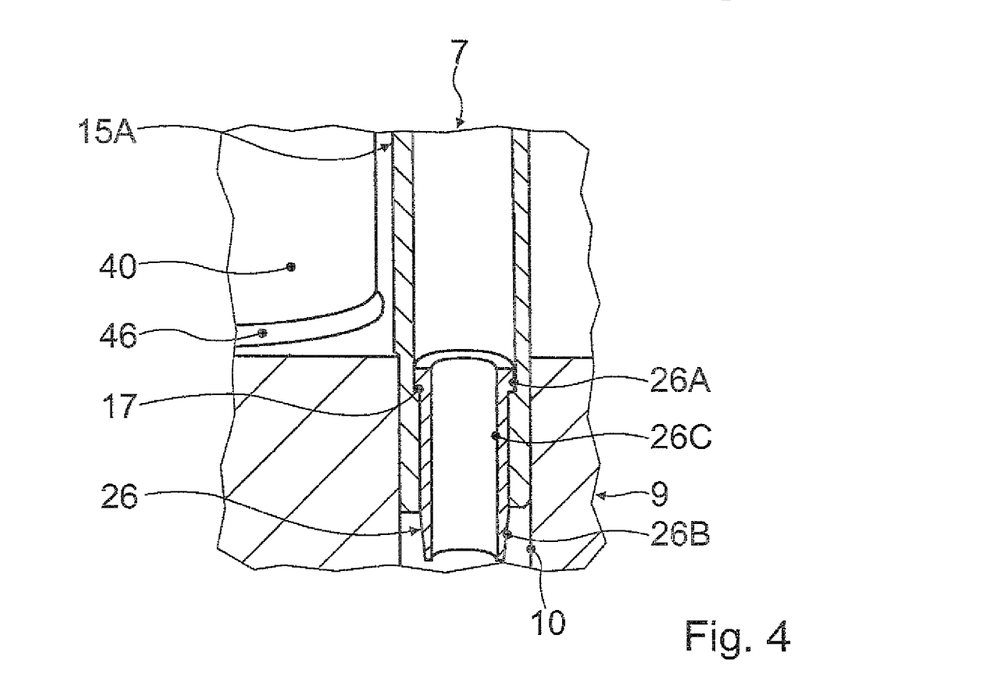
FIG. 4 is a schematic longitudinal section through a sleevelike region of the control unit housing of FIG. 3, with the fastening element in the installed state.

FIGS. 3 and 4, of the similarly embodied tubes 15A and 15B, show as an example the first tube 15A of the control unit housing 7, of which tube a region remote from the bottom face 18 is guided through a bore 10 of the hydraulic assembly housing 9. The control unit housing 7 is introduced into the bore 10 in the hydraulic assembly housing 9 far enough that the coils 40 placed in the control unit housing 7 rest on the hydraulic assembly housing 9.

A boltlike pin 26 is shown in FIG. 3 in an assembly position and in FIG. 4 in the installed state; this pin has an insertion chamfer 26B on its end remote from the bottom face 18 of the control unit housing 7 and has a radially widened portion 26A on its end oriented toward the bottom face 18 of the control unit housing 7.

In the installed state, the pin 26 widens the tube 15A in the region of its narrowed diameter 17 and presses the tube 15A in the bore of the hydraulic assembly housing 9 against the hydraulic assembly housing 9, so that the tube 15A and thus the control unit housing 7 are affixed to the hydraulic assembly housing 9. In the installed state, the pin is introduced so far into the tube 15A of the control unit housing that the radially widened portion 26A of the pin 26 rests on the shoulder 17 of the tube 15A of the control unit housing 7.

As can be seen from FIG. 5, the pin 26, provided with a through opening 26C, in the version shown, in a preassembled state, is pressed into a connection plug 30 of the motor 11, so that the connection plug 30 in the installed state is guided by the tube 15A of the control unit housing 7.

Figure 9:
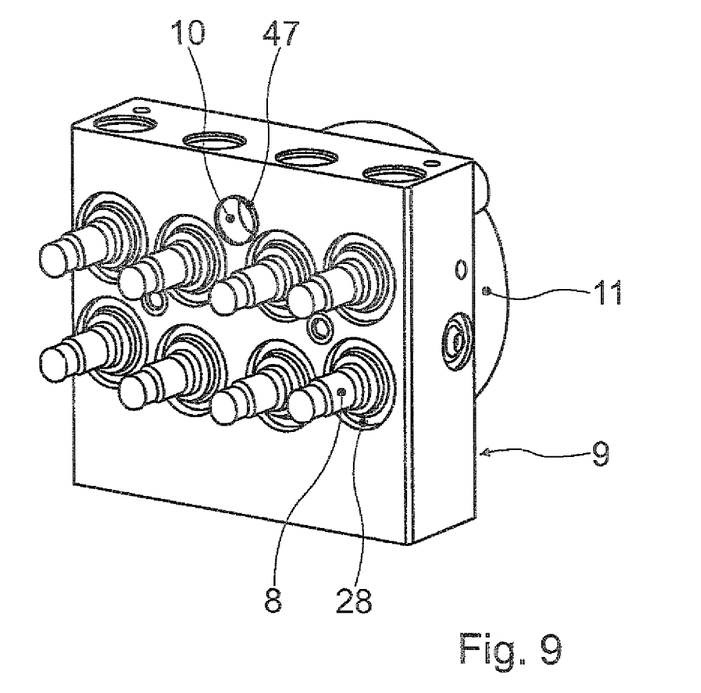
FIG. 9 is a simplified three-dimensional view of a hydraulic assembly housing with magnet valves affixed to it.

Referring also to FIG. 9, it may be seen that for sealing off the tube 15 A containing the connection plug 30 from the hydraulic assembly housing 9, a third fluid seal 47 is applied radially around the bore 10 of the hydraulic assembly housing 9, into which bore the tube 15A, containing the connection plug 30, is guided in the installed state.

The cross-linking and curing of the seal 47, applied or dispensed by the fluid process and which spreads out radially upon an insertion of the tube 15A into the bore 10 of the hydraulic assembly housing 9, can advantageously be done, as with the seals 45, 46 as well, at room temperature, since the control unit housing 7 is retained mechanically on the hydraulic assembly housing 9 via the pin 26.

As can be learned from FIG. 9, radially around the magnet valves 8 that are hydraulically closely wedged to the hydraulic assembly housing 9, a respective indentation 28 is provided in the hydraulic assembly housing 9 for receiving the coils 40, and the coils 40 are located in this indentation in the installed state. The coils 40 determine the spacing between the control unit housing 7 and the hydraulic assembly housing 9.

FIGS. 6 and 8 show the fluid seal 46, distributed radially around the individual indentations 28, and this seal, upon introduction of the coils 40 into the indentations 28, cures at room temperature. The axial tolerances of the coil 40 in the installed state are very close, favorably affecting the efficiency of the coils 40 and the thermal concept of the entire structural unit and improving the regulation quality of the magnet valves 8, guided by the coils 40 in the installed state, compared with inlay seals.

As a result of the sealing off according to the invention of the receiving chamber 12 formed by the control unit housing 7 and the hydraulic assembly housing 9, a medium can flow through the receiving chamber 12 in the installed state without the electrical components coming into contact with the medium.

The foregoing relates to the preferred exemplary embodiment of the invention, it being understood that other variants and embodiments thereof are possible within the spirit and scope of the invention, the latter being defined by the appended claims.

The invention claimed is:

1. A structural unit comprising:
a control unit housing and a hydraulic assembly housing, the hydraulic assembly housing including a first main surface and the control unit housing including a second main surface, the control unit housing and the hydraulic assembly housing being connected together with the first main surface and the second main surface arranged facing each other and forming a receiving chamber therebetween, and
at least one electrical component located in the receiving chamber, the at least one electrical component including a covering, the covering extending through the receiving chamber and including a first end portion connected to the first main surface of the hydraulic assembly housing on a first side of the receiving chamber and a second end portion connected to the second main surface of the control unit housing on a second side of the receiving chamber,
wherein a first seal, applied by a liquid method, is provided in a region of contact between the first end portion of the covering and the first main surface to seal the first end portion of the covering to the hydraulic assembly housing, the first seal being in direct contact with the first end portion of the covering,
wherein the at least one electrical component includes an electromagnetic coil, the electromagnetic coil surrounding a magnet valve that extends from the hydraulic assembly housing, and
wherein the second end portion of the covering is connected to the control unit housing such that the at least one electrical component is sealed from the receiving chamber,
wherein a second seal is provided that seals the second end portion of the covering of the electromagnetic coil to the control unit housing, the second seal being applied by a liquid method in a region of contact between the second end portion of the covering of the electromagnetic coil and the control unit housing such that the second seal is in direct contact with both the second end portion of the covering and the control unit housing,
wherein the first main surface of the hydraulic assembly housing defines a first recess in which the first end portion of the covering is received, the first recess being shaped to suit a circumferential contour of the first end portion of the covering,
wherein the second main surface of the control unit housing defines a second recess in which the second end portion of the electromagnetic coil is received, the second recess being shaped to suit a circumferential contour of the second end portion of the covering of the electromagnetic coil,
wherein the first seal is disposed on a circumference of the first recess, and
wherein the second seal is disposed on a circumference of the second recess.

2. A structural unit comprising:
a control unit housing and a hydraulic assembly housing, the hydraulic assembly housing including a first main surface and the control unit housing including a second main surface, the control unit housing and the hydraulic assembly housing being connected together with the first main surface and the second main surface arranged facing each other and forming a receiving chamber therebetween, and
at least one electrical component located in the receiving chamber, the at least one electrical component including a covering, the covering extending through the receiving chamber and including a first end portion connected to the first main surface of the hydraulic assembly housing on a first side of the receiving chamber and a second end portion connected to the second main surface of the control unit housing on a second side of the receiving chamber,
wherein a first seal, applied by a liquid method, is provided in a region of contact between the first end portion of the covering and the first main surface to seal the first end portion of the covering to the hydraulic assembly housing, the first seal being in direct contact with the first end portion of the covering,
wherein the at least one electrical component includes an electromagnetic coil, the electromagnetic coil surrounding a magnet valve that extends from the hydraulic assembly housing, and
wherein the second end portion of the covering is connected to the control unit housing such that the at least one electrical component is sealed from the receiving chamber,
wherein a second seal is provided that seals the second end portion of the covering of the electromagnetic coil to the control unit housing, the second seal being applied by a liquid method in a region of contact between the second end portion of the covering of the electromagnetic coil and the control unit housing such that the second seal is in direct contact with both the second end portion of the covering and the control unit housing,
wherein the at least one electrical component further includes a connecting plug extending between an electric motor located in the hydraulic assembly housing and an electrical regulating device of a control unit received by the control unit housing, the connecting plug including a cylindrical cover fixedly connected to the control unit housing and extending from the control unit housing toward the hydraulic assembly housing,
wherein the hydraulic assembly housing includes a bore in which the cylindrical cover of the connecting plug is received, the bore providing access to the electric motor for the connecting plug, and
wherein a third seal is disposed radially within the bore around the cylindrical cover and in contact with both the cylindrical cover and the bore to seal the bore and the cylindrical cover from the receiving chamber, the third seal being applied as a liquid.

3. The structural unit of claim 1, wherein the first recess in the hydraulic assembly housing includes an indentation, and
wherein the first end portion of the covering of the electromagnetic coil is configured to snap into the indentation.

4. A structural unit comprising:
a control unit housing defining a first space for enclosing an electrical regulating unit and including a hollow, cylindrical projection having a passage that leads to the first space, the cylindrical projection extending from a first main surface on the control unit housing;
a hydraulic assembly housing defining a second space for enclosing an electric motor and including a bore that leads to the second space, the bore extending through a second main surface on the hydraulic assembly housing, the hydraulic assembly housing being attached to the control unit housing with the second main surface arranged facing and spaced apart from the first main surface to form a receiving chamber therebetween and with the cylindrical projection of the control unit housing extended through the receiving chamber and received within the bore in the hydraulic assembly housing;

a connecting plug that extends from the first space through the cylindrical projection and through the bore into the second space for electrically connecting the electric motor to the electrical regulating device;

a first seal applied by a fluid process and disposed radially within the bore around the cylindrical projection, the first seal contacting both the cylindrical projection and the bore to seal the second space from the receiving chamber;

a magnet valve extends through the receiving chamber from the second main surface to a valve opening in the first main surface;

an electromagnetic coil that surrounds the magnet valve in the receiving chamber, the electromagnetic coil including a coil covering having a first end portion contacting the first main surface around the valve opening and a second end portion contacting the second main surface around the magnet valve;

a second seal applied by a fluid process to a region of contact between the first end portion of the coil covering and the first main surface surrounding the valve opening to seal the magnet valve from the receiving chamber at the first main surface; and a third seal applied by a fluid process to a region of contact between the second end portion of the coil covering and the second main surface surrounding the magnet valve to seal the magnet valve from the receiving chamber at the second main surface.

5. The structural unit of claim 4, wherein a first recess is defined in the first main surface and a second recess is defined in the second main surface, wherein the valve opening is located in a base portion of the first recess and the magnet valve extends from a base portion of the second recess, wherein the first recess is sized to receive the first end portion of the coil covering and the second recess is sized to receive the second end portion of the coil covering, and wherein the second seal is disposed annularly on a circumferential contour of the first recess and the third seal is disposed annularly on a circumferential contour of the second recess.

6. The structural unit of claim 5, wherein the electromagnetic coil includes contact plugs that extend from the first end portion of the coil covering, and wherein the first recess includes plug openings through which the contact plugs of the electromagnetic coil are extended for connection to the electrical regulating unit, and wherein the first seal forms a perimeter around the plug openings in the first recess.

7. The structural unit of claim 5, wherein the second recess includes an indentation, and wherein the second end portion of the coil covering is configured to snap into the indentation.

8. The structural unit of claim 4, wherein a plurality of magnet valves extend from the receiving chamber from first valve openings in the first main surface to second valve openings in the second main surface, wherein an electromagnetic coil surrounds each of the magnet valves in the receiving chamber, each electromagnetic coil having a coil covering with a first end portion contacting the first main surface around the corresponding first valve opening and a second end portion contacting the second main portion around the corresponding second valve opening, wherein the second seal is applied by a fluid process to regions of contact between the first end portions of the coil coverings and the first main surface surrounding the associated first valve openings; and wherein the third seal is applied by a fluid process to regions of contact between the second end portions of the coil coverings and the second main surface surrounding the second valve openings.

9. A structural unit comprising:

a control unit housing defining a first space for enclosing an electrical regulating unit and including a hollow, cylindrical projection having a passage that leads to the first space, the cylindrical projection extending from a first main surface on the control unit housing, the control unit housing defining a valve opening in the first main surface that is spaced apart from the cylindrical projection;

a hydraulic assembly housing defining a second space for enclosing an electric motor and including a bore that leads to the second space, the bore extending through a second main surface on the hydraulic assembly housing, the hydraulic assembly housing including a magnet valve that extends from the second main surface, the hydraulic assembly housing being attached to the control unit housing with the second main surface arranged facing and spaced apart from the first main surface to form a receiving chamber therebetween, the cylindrical projection of the control unit housing extended through the receiving chamber and received within the bore in the hydraulic assembly housing, and with the magnet valve extended through the receiving chamber and received in the valve opening;

a connecting plug that extends from the first space through the cylindrical projection and through the bore into the second space for electrically connecting the electric motor to the electrical regulating device;

an electronic coil that surrounds the magnet valve in the receiving chamber, the electromagnetic coil including a coil covering having a first end portion contacting the first main surface around the valve opening and a second end portion contacting the second main surface around the magnet valve;

a first seal applied by a fluid process and disposed radially within the bore around the cylindrical projection, the first seal contacting both the cylindrical projection and the bore to seal the second space from the receiving chamber;

a second seal applied by a fluid process to a region of contact between the first end portion of the coil covering and the first main surface surrounding the valve opening to seal the magnet valve from the receiving chamber at the first main surface; and a third seal applied by a fluid process to a region of contact between the second end portion of the coil covering and the second main surface surrounding the magnet valve to seal the magnet valve from the receiving chamber at the second main surface.

10. The structural unit of claim 9, wherein a first recess is defined in the first main surface and a second recess is defined in the second main surface, wherein the valve opening is located in a base portion of the first recess and the magnet valve extends from a base portion of the second recess, wherein the first recess is sized to receive the first end portion of the coil covering and the second recess is sized to receive the second end portion of the coil covering, and wherein the second seal is disposed annularly on a circumferential contour of the first recess and the third seal is disposed annularly on a circumferential contour of the second recess.

11. The structural unit of claim 5, wherein the electromagnetic coil includes contact plugs that extend from the first end portion of the coil covering, and wherein the first recess includes plug openings through which the contact plugs of the electromagnetic coil are extended for connection to the electrical regulating unit, and wherein the first seal surrounds the plug openings in the recess.

12. The structural unit of claim 5, wherein the second recess includes an indentation, and wherein the second end portion of the coil covering is configured to snap into the indentation.

\* \* \* \* \*